(No Model.)
R. C. FORSYTH.
DEVICE FOR PROTECTING STEAM PIPES.
No. 504,871. Patented Sept. 12, 1893.
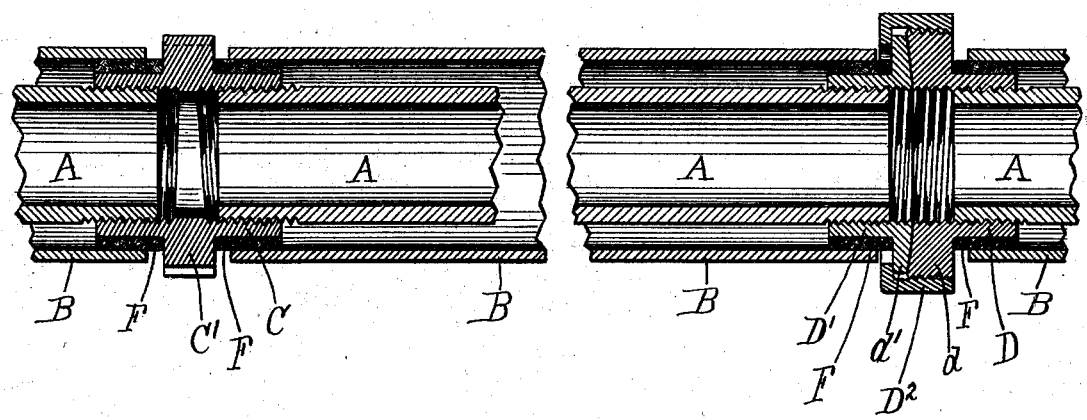
Witnesses
E. T. Wray.
Jean Elliott.
Inventor:
Robert C. Forsyth
By Burton and Burton
atty's

UNITED STATES PATENT OFFICE.

ROBERT CLARKE FORSYTH, OF CHICAGO, ILLINOIS.

DEVICE FOR PROTECTING STEAM-PIPES.

SPECIFICATION forming part of Letters Patent No. 504,871, dated September 12, 1893.

Application filed February 9, 1893. Serial No. 461,584. (No model.)

*To all whom it may concern:*

Be it known that I, ROBERT CLARKE FORSYTH, a citizen of the United States, residing at Chicago, county of Cook, and State of Illinois, have invented certain new and useful Improvements in Devices for Protecting Steam-Pipes, which are fully set forth in the following specification, reference being had to the accompanying drawing, forming a part thereof.

The purpose of this invention is to provide an improved substitute for the more or less perfectly insulating wrappings and sheathings for steam or other heating pipes, which are commonly employed to prevent the loss of heat by radiation, and consequent condensation of steam in the pipes. It is perfectly adapted for use about pipes used to contain steam for heating, but is also suitable for the protection of pipes that carry steam at a higher tension than is usual for mere heating purposes.

In general, the invention consists in sheathing the steam pipe in a pipe of larger inner diameter than the outer diameter of a steam pipe, thereby forming a dead-air chamber around the steam pipe.

Specifically, it comprises suitable coupling devices for the double or compound pipe system which is thus created.

In the drawing:—the figure is an axial section through a pipe having a union connection at one end and a coupling at the other end, and embodying at both said connections my invention as applied to said forms of connection respectively.

A A A represent consecutive sections of the steam pipe, and B B B, corresponding sections of the protecting pipe.

C is a right-and-left coupling which may be used to connect adjacent sections of steam pipe, being a modification of the ordinary right-and-left coupling to adapt it to serve the usual purpose of such couplings in connection with my invention which includes the outer pipes.

D D' are the two members of a union adapted to connect the two adjacent sections of the steam pipe, and modified from the usual form of such connections to adapt the device to special functions involved in its use with the outer protecting pipes of my invention.

The modification of the right-and-left coupling will appear from the description. The coupling has, midway between its ends, a band or circular boss C', the edge portions at each side of the band being elongated more than would ordinarily be required for the mere purpose of coupling the pipes, and made cylindrical to a fair degree of accuracy.

F F, &c., are packing rings of asbestus or other fibrous material, or any material suitable to endure the heat of the steam pipe without deterioration. The diameter of the outer pipes B B B is such as to leave an air chamber of probably a quarter of an inch in diameter between the steam pipe and the protecting pipe, and the thickness of the end portions of the coupling, added to the thickness of the packing ring F, is only enough greater than the diameter of this chamber to make it necessary to slightly compress the packing in order to slip the end of the outer pipe over it when the packing ring is properly seated upon the end portion of the coupling, as seen in the drawing. The steam pipe, being inserted within the protecting pipe, section by section, the run of pipe may be connected up in the usual manner, so far as operation of the couplings or unions is concerned, except that the packing rings F F, being suitably seated on the end portion of the coupling, the ends of the protecting pipe will be passed over the rings as the coupling is screwed onto the steam pipe, any necessary compression of the packing being made to cause it to enter the end of the protecting pipe. The length of the packing rings and of the end portions of the couplings on which the rings seat should be sufficient to allow for all the expansion which may occur in the steam pipe on account of its being heated, between the extremes of temperature to which it is subject, and enough more to constitute a reasonably secure seat against air leakage through the joint thus afforded. The expansion of an iron steam pipe of sixteen-foot length between the usual extremes not exceeding three-eighths of an inch, I consider it satisfactory to make the said end portions and seat for the packing rings and the rings themselves, from three-fourths of an inch to an inch in length. The sections of pipe being usually coupled up when they are at ordinary temperature, and any falling of the temperature below ordinary being likely to affect both pipes about alike, since such falling of temperature will not be due to the presence of steam, it will be found desirable, usually, to so connect the pipes that in that condition,—that is, when cold,—the ends of the protecting pipe B abut against the shoulders of the bosses C' of the couplings. When the steam is turned on, the expansion of the steam pipe will lengthen it and a little sliding will take place between the packing F F and the protecting pipe seated thereon; and if all the movement should occur at one end of the pipe, amounting probably, as above stated, to about three-eighths of an inch, it would still leave a seat at that end of three-eighths to five-eighths of an inch, the seat at the other end being undisturbed. There will thus be a practically tight dead-air chamber maintained around each section of steam pipe.

The modification in the union consists simply in increasing the flange d' of the member D' beyond what it would ordinarily be made for the purpose of constituting the shoulder for the nut $D^2$, by an amount about equal to the diameter of the dead-air chamber, which increase will accommodate the thickness of the packing ring of the protecting pipe, which will abut against the flange as they do against the shoulder of the boss C' in the case of the coupling, the union nut $D^2$ having its central aperture large enough so that it will slip on outside of the protecting pipe B. In like manner, the other member D of the union has the threaded enlargement d at the end of as much greater diameter than the hub which is screwed onto the pipe as necessary to accommodate the thickness of the packing ring and of the pipe B, as seen in the drawing.

This invention is particularly useful for conducting steam from the locomotive of a railway train to the cars for heating purposes, because the unavoidable exposure of the pipes commonly used for such purposes renders them liable to become choked with condensation and frost, thus cutting off the steam.

I claim—

1. In combination with the inner pipe sections, a right-and-left coupling adapted to unite them having intermediate its ends the encircling boss C', the protecting pipes, whose inner diameter adapts them to receive the ends of the coupling and cylindrical packing rings interposed on said ends between the same and the protecting pipe to form slip joints; substantially as set forth.

2. In combination, substantially as set forth, the inner pipe sections A A, the union for connecting them, comprising the members D D' and the nut $D^2$, the outer protecting pipe and the packing rings on the hubs of the union and within the ends of the protecting pipe, the nut being adapted to slip over the end of the protecting pipe.

In testimony whereof I have hereunto set my hand, at Chicago, Illinois, in the presence of two witnesses, this 6th day of February, 1893.

ROBERT CLARKE FORSYTH.

Witnesses:
CHAS. S. BURTON,
JEAN ELLIOTT.